(12) United States Patent
Staehle

(10) Patent No.: US 10,401,894 B2
(45) Date of Patent: Sep. 3, 2019

(54) ACTUATOR DEVICE

(71) Applicant: Kurt Staehle, Neuhausen-Steinegg (DE)

(72) Inventor: Kurt Staehle, Neuhausen-Steinegg (DE)

( * ) Notice: Subject to any disclaimer, the term of this patent is extended or adjusted under 35 U.S.C. 154(b) by 305 days.

(21) Appl. No.: 15/416,999

(22) Filed: Jan. 26, 2017

(65) Prior Publication Data

US 2017/0212547 A1    Jul. 27, 2017

(30) Foreign Application Priority Data

Jan. 27, 2016   (EP) .................................... 16152954

(51) Int. Cl.
| | |
|---|---|
| *G05G 1/54* | (2008.04) |
| *B60T 7/12* | (2006.01) |
| *F16D 41/066* | (2006.01) |
| *F16F 15/30* | (2006.01) |
| *F16H 1/28* | (2006.01) |
| *B60T 7/04* | (2006.01) |
| *G01L 5/22* | (2006.01) |
| *B60K 23/02* | (2006.01) |
| *B60K 26/04* | (2006.01) |

(52) U.S. Cl.
CPC ................ *G05G 1/54* (2013.01); *B60T 7/045* (2013.01); *B60T 7/12* (2013.01); *F16D 41/066* (2013.01); *F16F 15/30* (2013.01); *F16H 1/28* (2013.01); *B60K 23/02* (2013.01); *B60K 26/04* (2013.01); *B60K 2026/043* (2013.01); *B60T 7/04* (2013.01); *G01L 5/225* (2013.01)

(58) Field of Classification Search
CPC .. G01L 5/225; G01L 5/28; G05G 1/54; B60T 7/12

USPC ........................................................... 73/132
See application file for complete search history.

(56) References Cited

U.S. PATENT DOCUMENTS

| | | | | |
|---|---|---|---|---|
| 2,036,700 | A | * | 4/1936 | Johnson .................... B60T 7/12 188/265 |
| 3,662,593 | A | * | 5/1972 | Pirrello .................. B60T 17/223 254/DIG. 5 |
| 4,742,720 | A | | 5/1988 | Storck |
| 5,954,164 | A | * | 9/1999 | Latham .................. B60T 17/223 188/112 R |
| 6,959,793 | B2 | * | 11/2005 | Cinquemani ............. B60T 7/04 188/112 R |

FOREIGN PATENT DOCUMENTS

| | | | |
|---|---|---|---|
| CN | 202676350 U | 1/2013 | |
| CN | 103423362 B | 8/2015 | |
| EP | 0 236 518 A1 | 9/1987 | |
| EP | 0235333 A1 | 9/1987 | |
| EP | 2 431 241 A1 | 3/2012 | |
| EP | 2431241 A1 * | 3/2012 | ................ B60T 7/06 |
| JP | 2010-195203 A | 9/2010 | |

* cited by examiner

*Primary Examiner* — Sherry L Estremsky
(74) *Attorney, Agent, or Firm* — Birch, Stewart, Kolasch & Birch, LLP

(57) ABSTRACT

An actuator device (2) for actuating at least one foot pedal (P) of a motor vehicle has at least one actuating element (8), whereby, for applying force to the foot pedal (P), said actuating element is shifted by means of a positioning mechanism (10) between an application position and a released position. It is provided that the positioning mechanism (10) is drivable with a positioning force (SF), by means of inertial means (such as an inertial mass).

20 Claims, 5 Drawing Sheets

ACTUATOR DEVICE

The invention relates to an actuator device for actuating at least one foot pedal of a motor vehicle, such as a brake pedal, gas pedal, or clutch pedal. The actuator device has at least one actuating element which is shifted by means of a positioning mechanism between an application position in which the associated foot pedal is pressed and a released position in which the associated foot pedal is released and thus assumes a starting position.

EP 2431241 A1 discloses an actuator device which has an actuating element for actuating a foot pedal. Additionally, an emergency device is provided by means of which the foot pedal can be brought into an emergency position. The emergency device has a gas spring for applying force to the actuating element in the direction of the emergency position.

Such an emergency device may be used, e.g., to bring the actuating element into an emergency position if the supply energy of the actuator device is decreased or completely fails. Depending on the type of foot pedal in question, the emergency position may be an application position (e.g. in the case of a brake pedal or clutch pedal) or may be a released position (e.g. in the case of a gas pedal). In order ensure that the foot pedal will be safely shifted into the desired emergency position, the gas spring must be dimensioned to a sufficient value in the given case; this necessitates a relatively large installation space for the combination of the emergency device and the actuator device.

The object of the invention was to devise means of a more compact structure, for an actuator device of the general type described above.

According to the invention, the positioning mechanism can be subjected to a positioning force via an inertial mass, so as to drive the positioning mechanism and to shift the actuating element. Thereby the actuating element can be shifted between the application position and the released position, by means of the inertial mass which is functioning either alone as the regular drive or additionally as an emergency drive which supplements a conventional drive. This enables a relatively compact design of the actuator device overall, and in particular for supplying an emergency function.

According to a particularly advantageous embodiment, the inertial mass is formed by a flywheel which is drivable around an axis. This enables the installation space needed for the inertial mass to be held particularly small, and also enables the energy supply required to achieve permanent movement of the inertial mass to be held particularly small.

In this connection, it is advantages for the flywheel to form a rotor, or to have a rotor, which can be driven by an interior stator. This enables one to provide a simple permanent drive for the inertial mass during operation of the actuator device, which drive requires only a minimal amount of electrical energy.

Advantageously, the flywheel may be coupled to a transmitting element via a gear wheel drive, via which the kinetic energy of the flywheel can be transmitted to the positioning mechanism in an impulsed manner. This enables very direct transmission of force and momentum from the flywheel to the transmitting element, and from the transmitting element to the actuating element (via the positioning mechanism).

It is advantageous if the gear wheel drive is formed of a planetary gear drive with a plurality of planetary gear wheels, which planetary gear wheels mesh interiorly with the flywheel and exteriorly with the transmitting element. Such a planetary gear drive makes it possible to reliably provide for stable transmission of forces and torques from the flywheel to the transmitting elements.

Advantageously, the planetary gears are held on a rotatable planetary gear holder which can be blocked along a rotational direction by means of a blocking device. Such a sudden ("jerky") stoppage of the rotational movement of the planetary gear holder by activation of the blocking device enables reliable transmission of forces from the flywheel to the transmitting element via the planetary gear wheels, in an impulsed manner.

It is further advantageous if a freewheel device is provided by means of which the transmitting element can be blocked against an application direction along which the transmission of forces from the flywheel in an impulsed manner occurs. This allows the transmitting element, and via the transmitting element also the positioning mechanism and the actuating element, to be held in the given position by means of the freewheel device, which position they previously assumed in an impulsed manner following the force application in an impulsed manner from the inertial mass; in particular this position in the case of a brake pedal or clutch pedal would be the application position, and in the case of a gas pedal it would be the released position.

Advantageously, the blocking device may be actuated jointly with the freewheel device, in order to enable reliable fixing of the actuating element immediately after the actuating element has been engaged.

According to another advantageous embodiment, the freewheel device has a sphere which, when the blocking device is in a blocking position, can be rolled in a first direction along an encircling guide groove of the transmitting element. In a second direction, opposite to the first direction, the sphere can be arrested, e.g. can be fixedly clamped, against the blocking device. With this arrangement, one can ensure safe functioning of the freewheel device, wherewith even in the blocking position the transmitting element can be rotated in the application direction until the actuating element is brought into the desired position. Thereupon, any further rotational movement of the transmitting element oppositely to the application direction is blocked, so that the actuating element will be held in its assumed position.

In any event it is advantageous if the inertial mass is provided as part of a redundant emergency positioning drive by means of which the positioning mechanism can be driven, in addition to driving by means of a standard drive. In this way, the actuator device can be actuated in normal operation by, e.g., a positioning motor, in order to repeatedly shift the actuating element back and forth between the application position and the released position. In parallel to this, the inertial mass is permanently driven. In circumstances where, e.g. the standard drive is suffering problems, the kinetic energy of the inertial mass can then be drawn upon, in order to bring the positioning mechanism and the actuating element into a prescribed position, in particular a position corresponding to an emergency position.

Alternatively, the inertial mass may itself be designed as part of a regular drive via which normal operation of the actuator device is carried out. Thereby one may eliminate a customary standard drive, e.g. in the form of a positioning motor. This enables a particular compact design of the actuator device. It also enables an appreciable reduction in the operating costs of the actuator device, because the energy needed to maintain rotational movement of the inertial mass is only a fraction of the energy needed in the case of direct drive using a customary positioning motor.

An exemplary embodiment of the invention is illustrated in the drawings.

Figure 1:
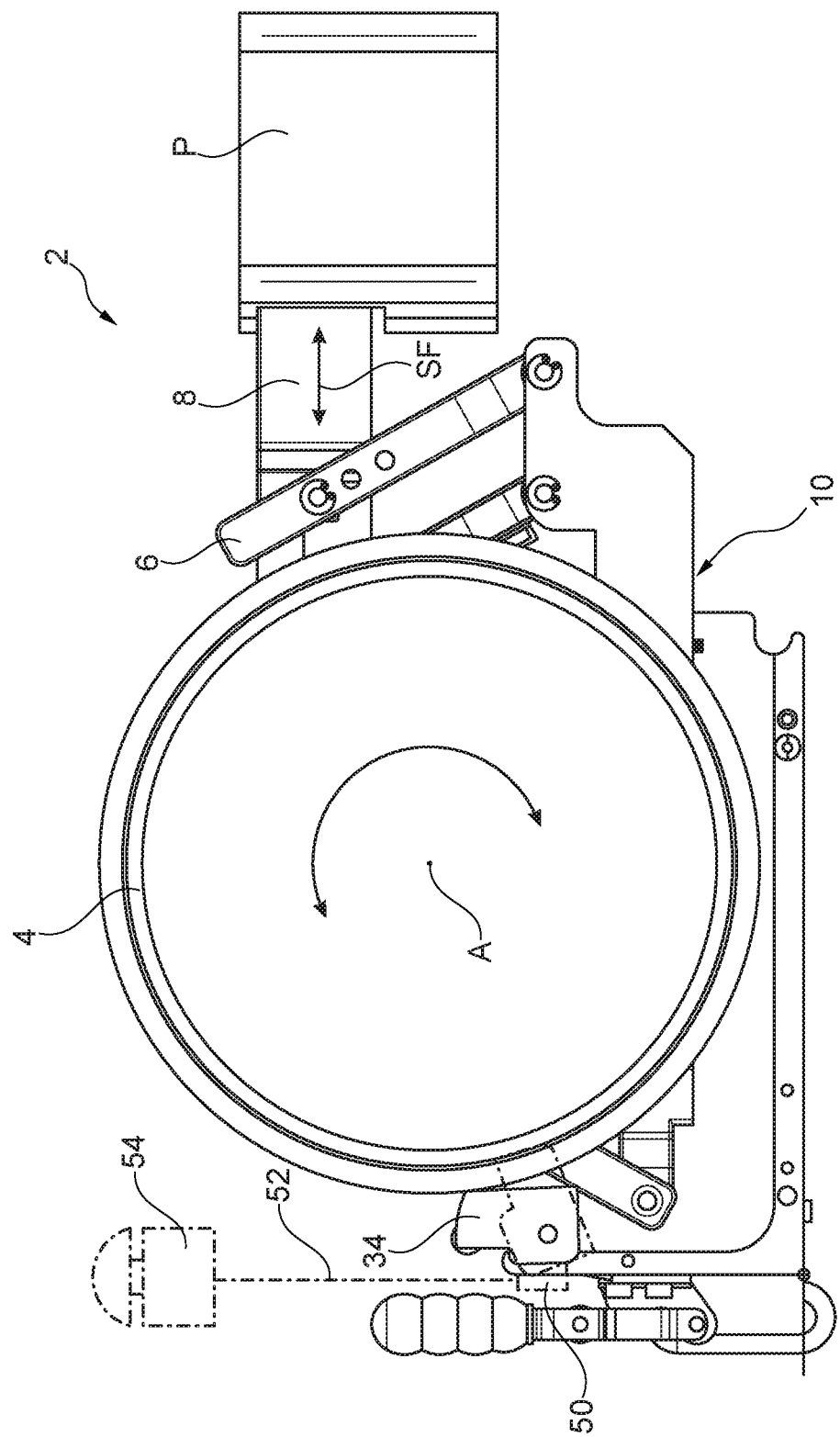
FIG. 1 depicts a lateral view of an inventive actuator device for actuating a foot pedal.

FIG. 1 depicts an actuator device 2 having an actuating element 8 to which a positioning force SF can be applied via a positioning mechanism 10. Thereby the actuating element 8 can be shifted between an application position and a released position, wherein in the application position a foot pedal P of a motor vehicle is actuated, and in the released position the foot pedal P is released. For this purpose, the positioning mechanism 10 has an essentially wheel-shaped transmitting element 4 which is rotatable around an axis A and which is kinematically coupled to the actuating element 8 via a rod 6 (in a manner not shown in detail).

Figure 2:
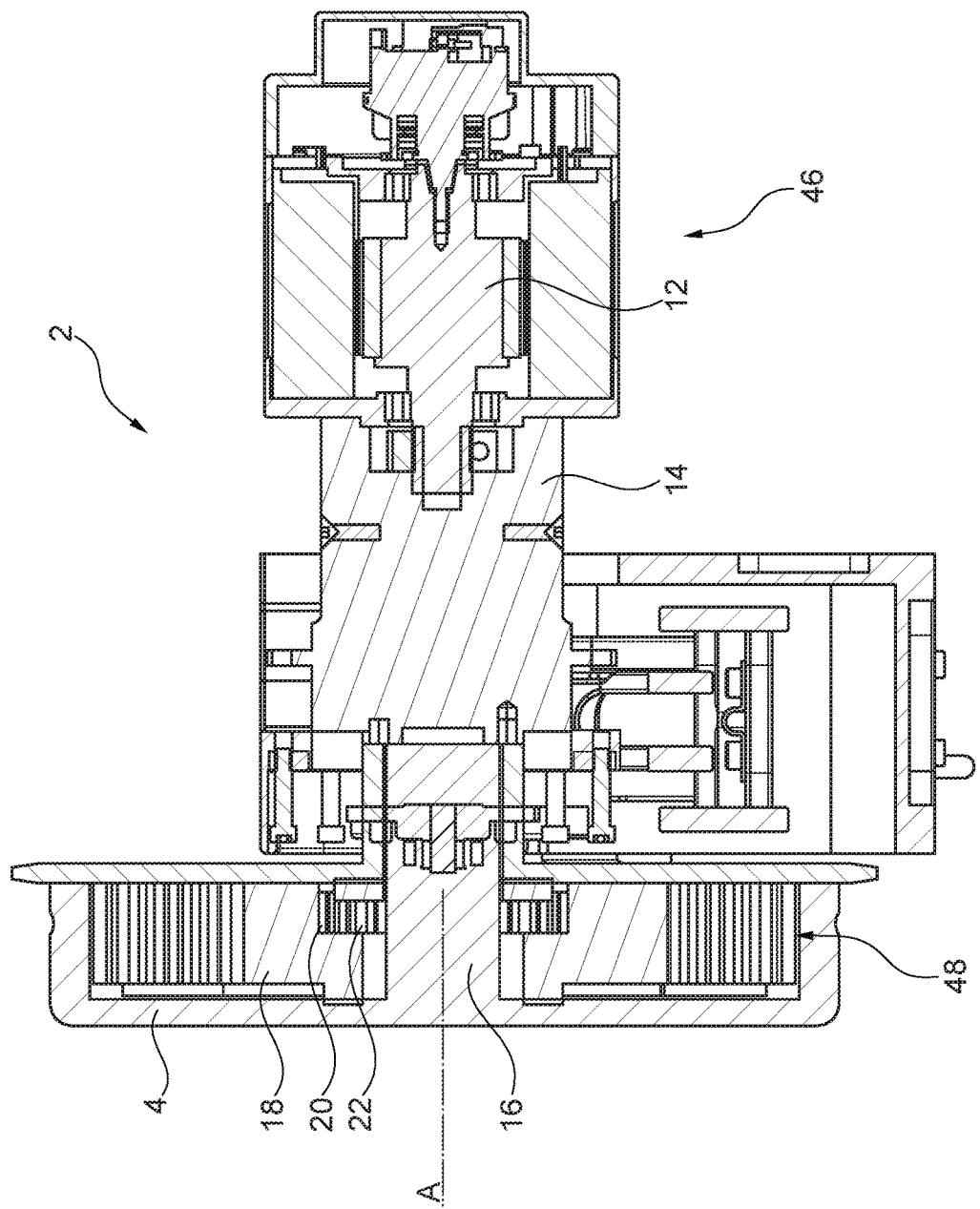
FIG. 2 depicts a cross sectional view of the actuator device.

As may be seen in particular from FIG. 2, the positioning mechanism 10 can be actuated by a motor 12 under the normal operating conditions of the actuator device, e.g. on a test stand or in remote controlled operation of the motor vehicle. The motor 12 is rotationally rigidly connected to an axle element 16 of the transmitting element 4 via a shaft 14. A ring-shaped flywheel 18 is provided around the axle element 16 which flywheel forms an inertial mass which is also rotatable around the axis A. For this purpose, the flywheel 18 may be, e.g., of unit construction with a rotor 20 which can be driven by an interior stator 22.

Figure 3:
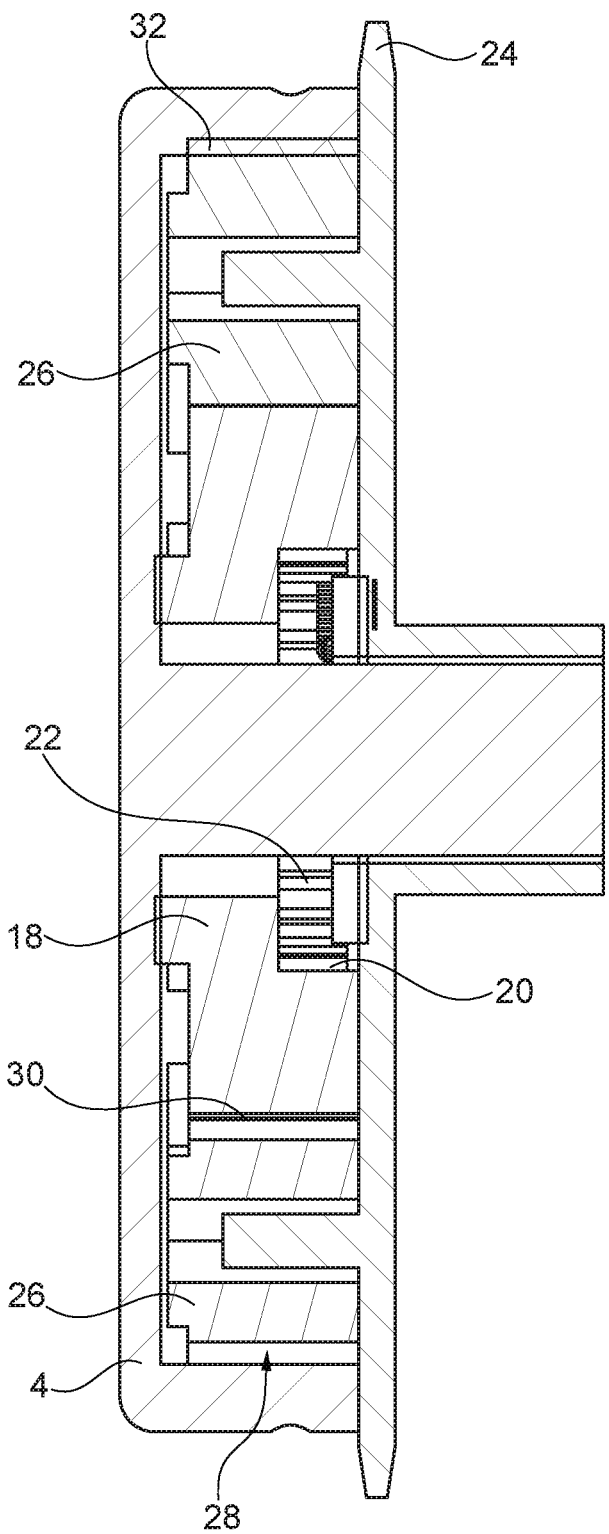
FIG. 3 depicts an enlarged cross sectional view through a gear drive for the actuator device according to FIG. 1.
Figure 4:
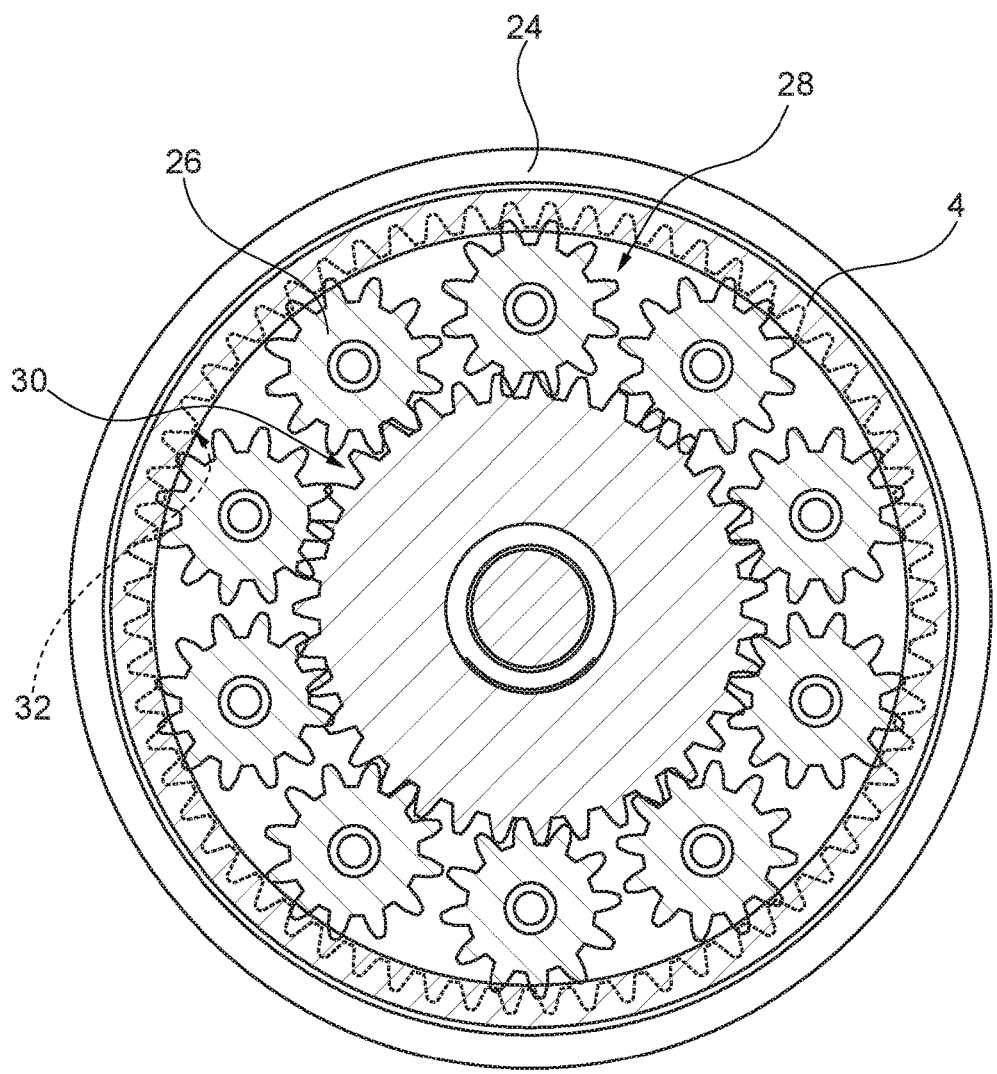
FIG. 4 depicts a cross sectional view of the gear drive according to FIG. 3.

Toward the outside, the flywheel 18 together with a plurality of planetary gear wheels 26 borne on a planetary gear holder 24 and together with the transmitting element 4 forms a planetary gear drive 28, as may be seen in particular from FIGS. 3 and 4. For this purpose, the flywheel 18 has outer toothing 30 on its outer side, which toothing 30 meshes with the planetary gear wheels 26. Further, the transmitting element 4 has inner toothing 32 on its inner side, which toothing 32 also meshes with the planetary gear wheels 26. In addition, the planetary gear wheels 26 are freely rotatably mounted on the planetary gear holder 24.

Figure 5:
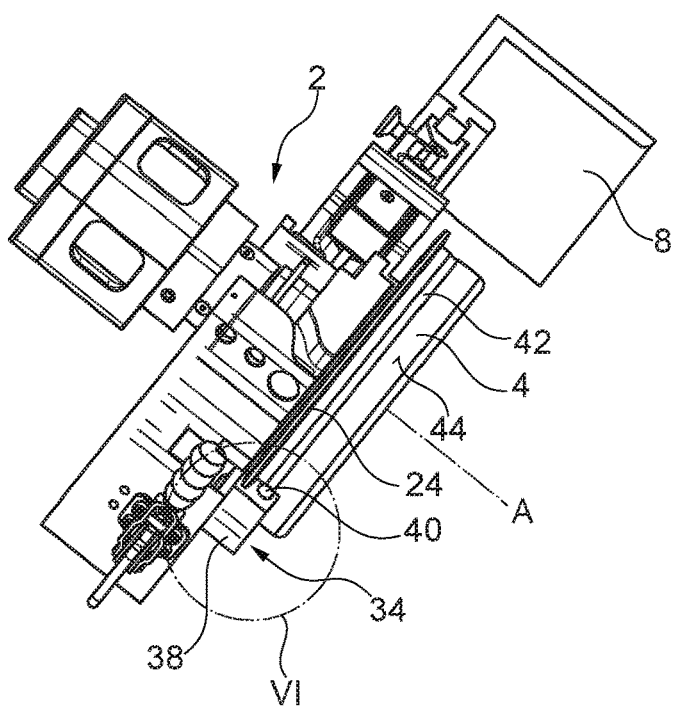
FIG. 5 depicts a plan view of the actuator device in a blocking position.
Figure 6:
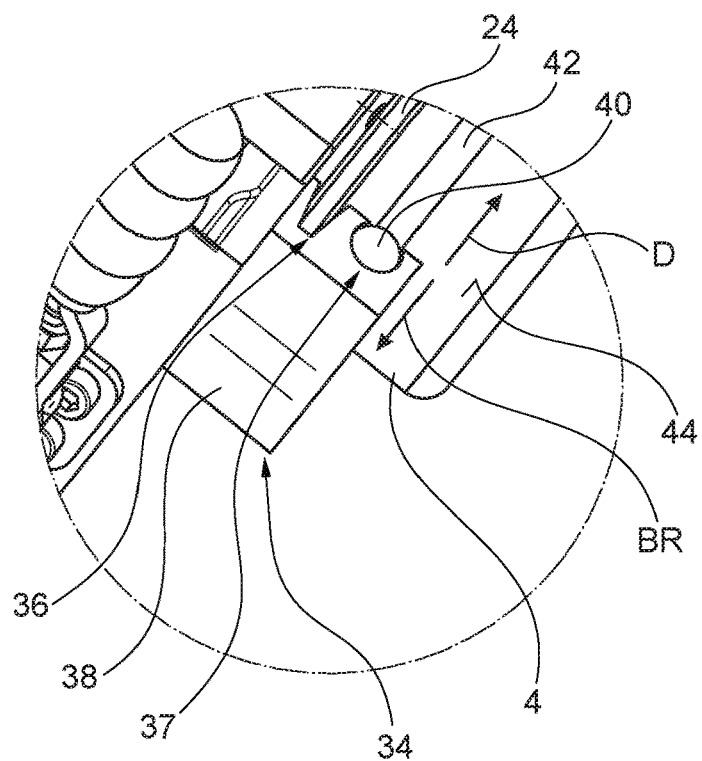
FIG. 6 depicts an enlarged view of a blocking device of the actuator device according to FIG. 5.

As may be seen from FIGS. 5 and 6, the actuator device 2 has a blocking device 34 by means of which a rotational movement of the planetary gear holder 24 around the axis A can be blocked. For this purpose, the blocking device 34 is swingably mounted with respect to the planetary gear holder 24, and has a clamping engaging piece 36 which can be clampingly engaged with an outer edge of the planetary gear holder 24, in a blocking position illustrated in FIGS. 5 and 6.

Further, a freewheel device 37 is provided on the blocking device 34, by means of which the transmitting element 4 can be blocked along a rotational direction D which is directed oppositely to an application direction BR. For this purpose, the freewheel device 37 [lit., "36"] has a sphere 40 which is rotatably mounted on a housing 38 of the blocking device 34, which sphere, when the blocking device 34 is in its blocking position, rests against a guide groove 42 provided in an outer surface 44 of the transmitting element 4. In this position, in the blocking position, the sphere 40 can roll along the guide groove 42, as long as the transmitting element 4 is rotated along the application direction BR. As soon as the rotational direction D of the transmitting element 4 is reversed, however, rotation of the sphere 40 is blocked by the housing 38, and thereby also the rotation of the transmitting element 4 against the application direction BR is blocked.

During operation of the actuator device 2 according to FIGS. 1 to 6, the motor 12 serves as a standard drive 46 for the positioning mechanism 10, by which the foot pedal P can be shifted back and forth between the application position and the released position by applying the positioning force SF via actuation of the actuating element 8. To achieve this, the motor 12 is rotated in the given desired direction, and the torque generated thereby is transmitted to the transmitting element 4 via the shaft 14 and the axle element 16. From there, the force transmission then proceeds via the rod 6 to the actuating element 8, which is shifted from the application position to the released position (or vice versa). This enables, e.g., remote controlled or automatic operation of the actuator device 2, e.g. during a vehicle test or on a test stand.

The flywheel 18 driven by the rotor 20 functions, along with the rest of the planetary gear drive 28, as an additional redundant emergency positioning drive 48. During operation of the actuator device 2, in this connection, the rotor 20 of the flywheel 18 is permanently driven (or maintained in motion) via the stator 22, independently of the motor 12. The planetary gear wheels 26 which mesh with the outer toothing 30 roll around the axis A with rotational movement of the planetary gear holder 24, on the inner toothing 32 of the transmitting element 4.

In an instance in which the actuating element 8 cannot be actuated via the standard drive 46, e.g. because it is defective or because the motor 12 does not have available sufficient driving energy, then the energy of the rotating flywheel 18 can be used to apply (to force) the positioning mechanism 10.

For this purpose, the blocking device 34 can be swung from the released position depicted in FIG. 1 into the blocking position shown with the dot-dashed lines, by means of an actuating device 50 which is connected to a triggering device 54, e.g. via a line 52 or via radio means, whereby the triggering device 54 may trigger said blocking device; the said blocking position corresponds to an emergency position. As depicted, the triggering device 54 may be in the form of an emergency handle or lever.

In this blocking position, the planetary gear support 24 is clampingly held by the clamping engaging piece 36, which prevents rotational movement of the planetary gear wheels 26 around the axis A in a jerky manner. Thereby the rotational movement of the flywheel 18 is transmitted in an impulsed manner to the planetary gear wheels 26 via the outer toothing 30, whereby an impulse-like torque is now applied to the transmitting element 4 via the inner toothing 32. This force applied to the transmitting element 4, which force was generated by the flywheel 18, is now further transmitted, in the form of the positioning force SF, to the actuating element 8, via the rod 6, which actuating element 8 in turn shifts the associated foot pedal P into the desired emergency position.

Even with the blocking device 34 being in the blocking position, the freewheel device 37 enables continued rotational movement of the transmitting element 4 in the application direction BR. However, as soon as an opposite movement of the transmitting element 4 is generated by means of restoring forces of the foot pedal P or the positioning mechanism 10, the sphere 40 of the freewheel device 37 is clampingly fixed against the housing 38, and the transmitting element 4 together with the positioning mechanism and the actuating element 8 are held in position to maintain the emergency positioning.

Alternatively to the embodiment of the actuator device 2 which is illustrated, in which the motor 12 functions as a standard drive 46 and the flywheel 18 driven by the rotor 20 functions only as an emergency positioning drive 48, it is also possible for the flywheel 18 in combination with the rest of the planetary gear drive 28 to be employed as the regular drive for normal operation of the actuator device 2.

Such an arrangement is suitable for, e.g., test stands wherein the service life of foot pedals P is being tested by repeated actuation using a specified test force. Under these circumstances, a number of seconds are available for developing the necessary rotational energy, whereas the retrieval of the force needs to take place in only fractions of a second. The power requirement of the flywheel 18, which in this case serves as the standard drive in combination with the planetary gear drive 28, is in this case only a fraction of the energy requirement [(power requirement)] of a conventional drive such as, e.g., a conventional positioning motor. In this way, the operating cost of the actuator device 2 can be substantially reduced. In addition, the actuator device 2 can be designed in a particularly compact manner in this way, since it is possible here to completely eliminate the standard drive 46 formed by the motor 12, according to FIG. 2.

The invention claimed is:

1. An actuator device for actuating at least one foot pedal of a motor vehicle, comprising:
    an actuator for applying force to the foot pedal; and
    a linkage for shifting the actuator between an application position and a released position;
    wherein the linkage is drivable with an inertial mass,
    wherein the inertial mass is a flywheel which is drivable around an axis.

2. The actuator device according to claim 1, wherein the flywheel forms or has a rotor which is drivable by an interior stator.

3. The actuator device according to claim 2, wherein the flywheel can be coupled to a transmitting element via a gear wheel drive.

4. The actuator device according to claim 2, wherein the inertial mass functions as part of a redundant emergency positioning drive by which the linkage can be driven, in addition to the drivability of said linkage by a standard drive.

5. The actuator device according to claim 2, wherein the inertial mass functions as part of a regular drive.

6. The actuator device according to claim 1, wherein the flywheel can be coupled to a transmitting element via a gear wheel drive.

7. The actuator device according to claim 6, wherein the gear wheel drive is formed by a planetary gear drive with a plurality of planetary gear wheels which mesh inwardly with the flywheel and mesh outwardly with the transmitting element.

8. The actuator device according to claim 7, wherein the planetary gears are held on a planetary gear holder which can be blocked along a rotational direction by a blocking device.

9. The actuator device according to claim 8, wherein a freewheel device so that the transmitting element can be blocked against an application direction.

10. The actuator device according to claim 9, wherein the freewheel device has a sphere which, when the blocking device is in a blocking position, can be rolled in a first direction along an encircling guide groove of the transmitting element, and can be fixed in a second, opposite direction.

11. The actuator device according to claim 9, wherein the blocking device and the freewheel device can be jointly actuated.

12. The actuator device according to claim 8, wherein the blocking device and the freewheel device can be jointly actuated.

13. The actuator device according to claim 12, wherein the freewheel device has a sphere which, when the blocking device is in a blocking position, can be rolled in a first direction along an encircling guide groove of the transmitting element, and can be fixed in a second, opposite direction.

14. The actuator device according to claim 6, wherein the inertial mass functions as part of a regular drive.

15. The actuator device according to claim 1, wherein the actuator device can be brought into an emergency position by a redundant emergency positioning drive.

16. The actuator device according to claim 1, wherein the inertial mass functions as part of a regular drive.

17. An actuator device for actuating at least one foot pedal of a motor vehicle, comprising:
    an actuator for applying force to the foot pedal, and
    a linkage for shifting the actuator between an application position and a released position;
    wherein the linkage is drivable with an inertial mass,
    wherein the inertial mass functions as part of a redundant emergency positioning drive by which the linkage can be driven, in addition to the drivability of said linkage by a standard drive.

18. An actuator device for actuating at least one foot pedal of a motor vehicle, comprising:
    an actuator for applying force to the foot pedal;
    a linkage for shifting the actuator between an application position and a released position;
    an inertial mass connected to the linkage; and
    a motor attached to the inertial mass.

19. The actuator device according to claim 18, further comprising:
    an axle extending from the inertial mass;
    a stator attached to the axle; and
    a rotor surrounding the stator.

20. The actuator device according to claim 18, further comprising:
    planetary gears surrounding the inertial mass; and
    a transmitting element surrounding the planetary gears,
    wherein teeth of the planetary gears mesh with teeth on the inertial mass and teeth on the transmitting element.

* * * * *